United States Patent
Akita et al.

(10) Patent No.: US 9,191,188 B2
(45) Date of Patent: Nov. 17, 2015

(54) TRANSMITTING DEVICE, SENDING DEVICE AND RECEIVING DEVICE

(71) Applicant: Kabushiki Kaisha Toshiba, Minato-ku, Tokyo (JP)

(72) Inventors: Koji Akita, Kanagawa (JP); Takayoshi Ito, Kanagawa (JP); Koichiro Ban, Kanagawa (JP); Takeshi Tomizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/465,635

(22) Filed: Aug. 21, 2014

(65) Prior Publication Data

US 2015/0063511 A1    Mar. 5, 2015

(30) Foreign Application Priority Data

Aug. 30, 2013  (JP) .................................. 2013-180172

(51) Int. Cl.
*H04L 7/00* (2006.01)

(52) U.S. Cl.
CPC ............ *H04L 7/0079* (2013.01); *H04L 7/0091* (2013.01)

(58) Field of Classification Search
CPC ....... H04L 7/0091; H04L 7/0079; H04L 7/00; H04L 7/0008
See application file for complete search history.

(56) References Cited

U.S. PATENT DOCUMENTS

| | | |
|---|---|---|
| 8,502,540 B2 | 8/2013 | Nakanishi et al. |
| 2002/0187749 A1* | 12/2002 | Beasley et al. ................... 455/41 |
| 2005/0085259 A1* | 4/2005 | Conner et al. ............. 455/552.1 |
| 2010/0248644 A1* | 9/2010 | Kishi et al. ....................... 455/68 |
| 2014/0016722 A1* | 1/2014 | Torimoto et al. ............. 375/295 |

FOREIGN PATENT DOCUMENTS

| | | |
|---|---|---|
| JP | 2006-268059 A | 10/2006 |
| JP | 2010-115256 A | 5/2010 |

* cited by examiner

*Primary Examiner* — Kenneth Lam
(74) *Attorney, Agent, or Firm* — Knobbe, Martens, Olson & Bear LLP

(57) ABSTRACT

According to one embodiment, a transmitting device includes a wireless transmitting unit which wirelessly transmits data. The transmitting device includes a wireless receiving unit which receives the data wirelessly transmitted by the wireless transmitting unit. The transmitting device includes a synchronization signal outputting unit which outputs a synchronization signal to a signal transmitting medium of an electric conductor. The transmitting device includes a synchronization outputting unit which receives the synchronization signal from the signal transmitting medium and outputs a signal including the data received by the wireless receiving unit according to the synchronization signal.

18 Claims, 18 Drawing Sheets

TRANSMITTING DEVICE, SENDING DEVICE AND RECEIVING DEVICE

CROSS-REFERENCE TO RELATED APPLICATIONS

This application is based upon and claims the benefit of priority from Japanese Patent Application No. 2013-180172, filed Aug. 30, 2013; the entire contents of which are incorporated herein by reference.

FIELD

Embodiments of the present invention relate to a transmitting device, a sending device and a receiving device.

BACKGROUND

In a device that provides an imaging unit in a rotating module such as a monitoring camera, an image signal acquired by taking an image by the imaging unit is requested to be transmitted to a base module through the rotating module. In the related art, a device having a brush-type contact point called a "slip ring" is used to avoid a wiring being twisted by rotation and disconnected.

DETAILED DESCRIPTION

According to one embodiment, a transmitting device includes a wireless transmitting unit which wirelessly transmits data. The transmitting device includes a wireless receiving unit which receives the data wirelessly transmitted by the wireless transmitting unit. The transmitting device includes a synchronization signal outputting unit which outputs a synchronization signal to a signal transmitting medium of an electric conductor. The transmitting device includes a synchronization outputting unit which receives the synchronization signal from the signal transmitting medium and outputs a signal including the data received by the wireless receiving unit according to the synchronization signal.

In the following, embodiments of the present invention are described in detail with reference to the drawings.

First Embodiment

Figure 1:
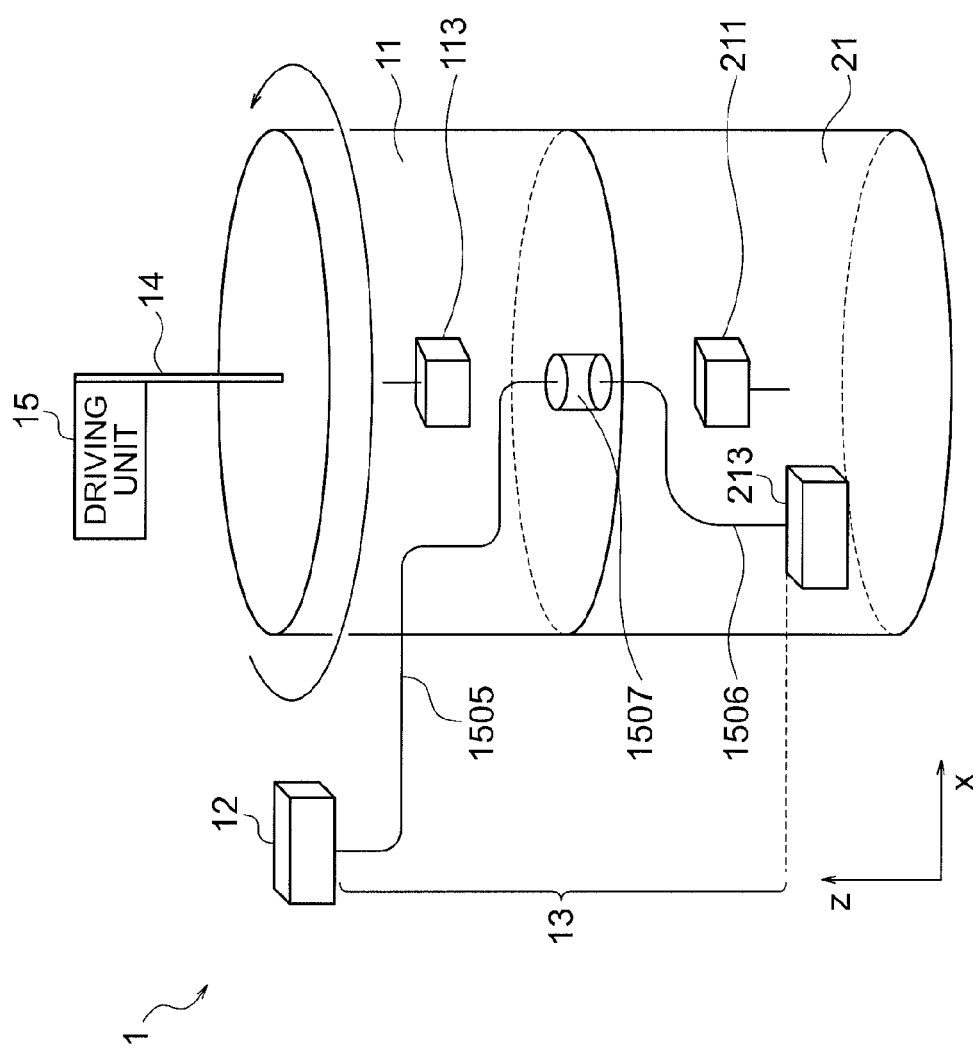
FIG. 1 is a schematic outline view of a transmitting device 1 in the first embodiment.

First, a transmitting device in the first embodiment is described. FIG. 1 is a schematic outline view of a transmitting device 1 in the first embodiment. The appearance of a first module 11 is a cylinder as one example, part of one surface of the first module 11 is connected with a rotation axis 14 and is provided with coupling means 1507. The outline of a second module 21 is a cylinder as one example.

A synchronization signal outputting unit 12 and a synchronization outputting unit 213 are connected by a second wiring 13, and it is possible to change the relative positions of the synchronization signal outputting unit 12 and the synchronization outputting unit 213 in a state where they are connected with the second wiring 13.

In the present embodiment, as one example, a driving unit 15 changes the relative positions of the synchronization signal outputting unit 12 and the synchronization outputting unit 213. To be more specific, for example, the driving unit 15 rotates the rotation axis 14. By this means, the second module 21 is fixed, the first module 11 relatively rotates with respect to the second module 21, and thereby the relative positions of the first module 11 and the second module 21 are changed. According thereto, the relative positions of the synchronization signal outputting unit 12 and the synchronization outputting unit 213 change.

A wireless transmitting unit 113 is installed in the first module 11 and a wireless receiving unit 211 is installed in the second module 21.

As one example, at least part of the second wiring 13 is arranged in the first module 11 or on the surface. In the present embodiment, as one example, the second wiring 13 is installed in the first module 11 and the second module 21.

Here, it may be possible to move the second wiring 13 according to the change in the relative positions of the first module 11 and the second module 21.

In the present embodiment, as one example, the second wiring 13 includes a first part 1505 whose one end is electrically connected with the synchronization signal outputting unit 12, a second part 1506 whose one end is electrically connected with the synchronization outputting unit 213, and the coupling means 1507 that couples another end of the first part 1505 and another end of the second part 1506 such that the first part 1505 is electrically connected with the second part 1506.

The coupling means 1507 can move according to the change in the relative positions of the first module 11 and the second module 21. As the coupling means 1507, for example, a slip ring or a rotary connector may be used.

In the present embodiment, as one example, the coupling means 1507 is the slip ring. For example, a rotating body held in the slip ring is installed in the first module 11. Moreover, in the rotating body, an annular electric circuit arranged in a concentric fashion is installed. In a brush held by the slip ring, for example, one end of is connected with the electric circuit and another end is connected with one surface of the second module 21. By this means, even when the first module 11 rotates, and thereby the rotating body rotates, the electric circuit rotates with respect to the brush while the brush and the electric circuit maintain the contact. By this means, since the conduction between the brush and the electric circuit is maintained even if the first module 11 rotates, the conduction between the first part 1505 and the second part 1506 is maintained.

According to the above, even in a case where the first module 11 is rotating or not, a synchronization signal output by the synchronization signal outputting unit 12 is transmitted to the first part 1505, the coupling means 1507 and the second part 1506 in order and transmitted to the synchronization outputting unit 213.

Here, although the rotating module is assumed to be the first module 11 and the fixed module is assumed to be the second module 21, they may be reversed. That is, the rotating module may be the second module 21 and the fixed module may be the first module 11.

Figure 2:
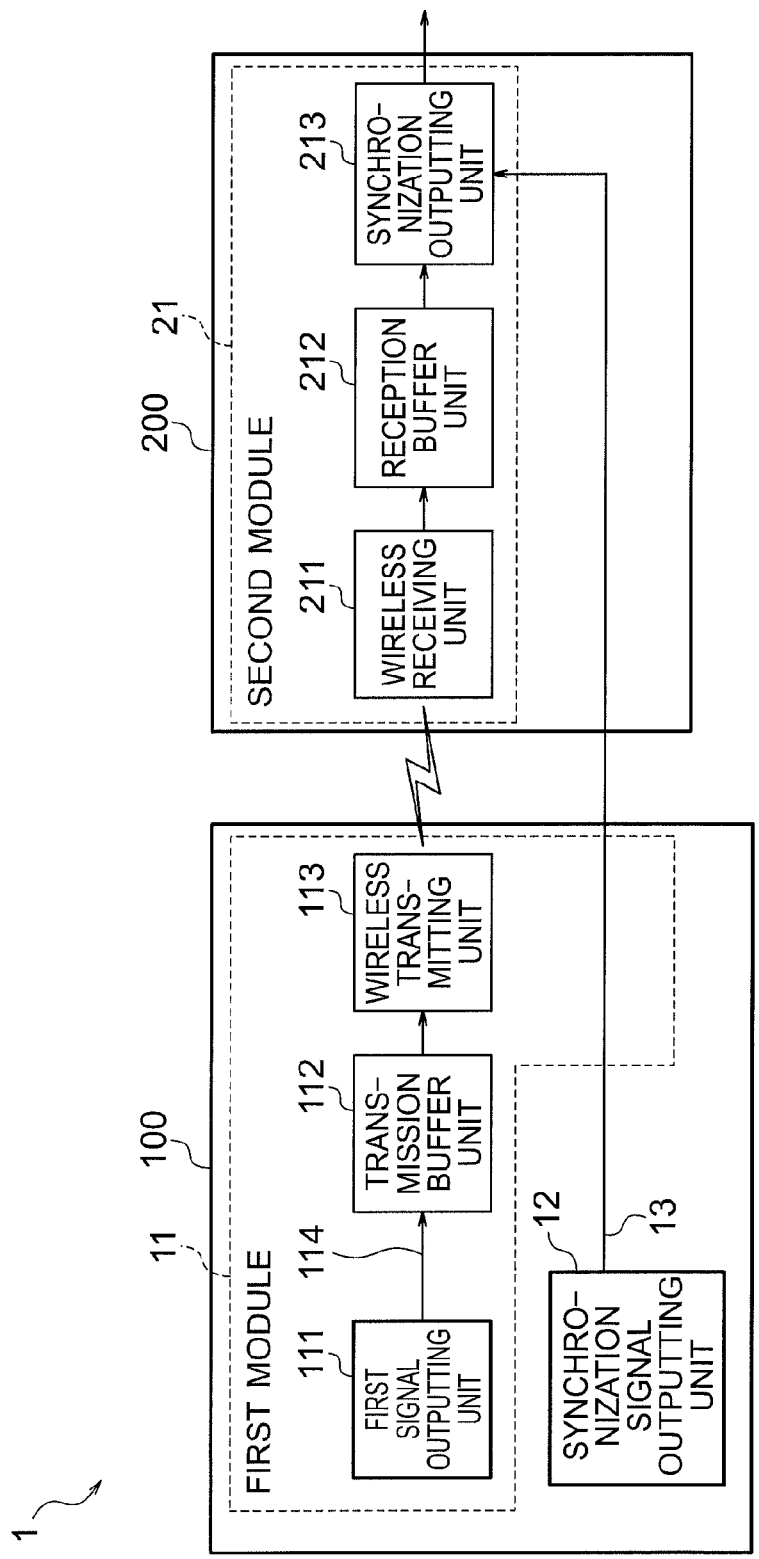
FIG. 2 is a schematic block diagram illustrating the configuration of the transmitting device 1 according to the first embodiment.

FIG. 2 is a schematic block diagram illustrating the configuration of the transmitting device 1 according to the first embodiment. The transmitting device 1 includes a sending device 100 and a receiving device 200 connected with the sending device 100 through the second wiring 13.

The sending device 100 wirelessly transmits a first signal including data to the receiving device 200. The first signal is a serial signal to transmit a signal of a first level or a second level at a constant cycle, for example.

The receiving device 200 transmits a synchronization signal to the receiving device 200 through the second wiring 13

The sending device 100 includes the first module 11 and the synchronization signal outputting unit 12 connected with the synchronization outputting unit 213 through the second wiring 13. The first module 11 includes a first signal outputting unit 111, a transmission buffer unit 112 connected with the first signal outputting unit 111 through a first wiring 114, the wireless transmitting unit 113 connected with the transmission buffer unit 112, and part of the second wiring 13.

The first signal outputting unit 111 outputs a first signal of a constant cycle including data. To be more specific, for example, the first signal outputting unit 111 generates the first signal and outputs the first generated signal to the transmission buffer unit 112 through the first wiring 114. The first signal outputting unit 111 is, for example, a sensor or a camera. In a case where the first signal outputting unit 111 is the camera, it outputs an imaging signal acquired by imaging to the transmission buffer unit 112 as the first signal.

The transmission buffer unit 112 accumulates the data included in the first signal output from the first signal outputting unit 111.

The wireless transmitting unit 113 wirelessly transmits data. To be more specific, for example, the wireless transmitting unit 113 wirelessly transmits the data included in the first signal output by the first signal outputting unit 111. Specifically, for example, the wireless transmitting unit 113 reads out the data accumulated in the transmission buffer unit 112 and wirelessly transmits a signal including the read data. At this time, for example, the wireless transmitting unit 113 encodes the acquired data, modulates a signal acquired by coding and wirelessly transmits a signal acquired by modulation.

The synchronization signal outputting unit 12 outputs a synchronization signal to a signal transmitting medium of an electric conductor. In the present embodiment, this signal transmitting medium is the second wiring 13 as one example. Here, as one example, the synchronization signal is a signal of a constant cycle. To be more specific, as one example, the synchronization signal is a serial signal to transmit a signal of the first level or the second level at a constant cycle. Moreover, as one example, the synchronization signal output by the synchronization signal outputting unit 12 is synchronized with the first signal output by the first signal outputting unit 111.

In the present embodiment, as one example, the synchronization signal outputting unit 12 outputs a synchronization signal, which is synchronized with the first signal and has a lower frequency than that of the first signal, to the synchronization outputting unit 213 through the second wiring 13.

The second wiring 13 transmits the synchronization signal output by the synchronization signal outputting unit 12 to the synchronization outputting unit 213 described later, via the first module 11 and the second module 21. The diameter of the second wiring 13 has a predetermined length, and, as one example, it is longer than the diameter of the first wiring 114. Moreover, as one example, the pass frequency of the second wiring 13 is lower than the pass frequency of the first wiring 114.

The receiving device 200 includes the second module 21.

The second module 21 includes the wireless receiving unit 211, a reception buffer unit 212 connected with the wireless receiving unit 211, and the synchronization outputting unit 213 connected with the reception buffer unit 212.

The wireless receiving unit 211 receives the data which the wireless transmitting unit 113 has wirelessly transmitted. Specifically, for example, the wireless receiving unit 211 demodulates the signal received from the wireless transmitting unit 113 and acquires data by decoding a signal acquired by demodulation. The wireless receiving unit 211 accumulates this data in the reception buffer unit 212.

The reception buffer unit 212 accumulates the data included in the signal received by the wireless receiving unit 211.

The synchronization outputting unit 213 receives the synchronization signal from the signal transmitting medium, and, according to this synchronization signal, outputs a signal including the data received by the wireless receiving unit 211 to an unillustrated device (for example, a display device or a storage device).

Specifically, for example, the synchronization outputting unit 213 outputs the signal (which may be referred to as a "third signal" below) in a cycle corresponding to the ratio of the cycle of the first signal to the cycle of the synchronization signal. In other words, the cycle of the signal output by the synchronization outputting unit is determined according to the ratio of the cycle of the first signal to the cycle of the synchronization signal. Specifically, for example, the cycle of the signal output by the synchronization outputting unit is the value obtained by multiplying the ratio (T1/T2) of cycle T1 of the first signal to cycle T2 of the synchronization signal by a predetermined scale factor.

Here, the predetermined scale factor includes one. In that case, the synchronization outputting unit 213 outputs the third signal by the following processing. As a premise, the synchronization outputting unit 213 holds information indicating the cycle of the first signal beforehand as one example. For example, the synchronization outputting unit 213 calculates the cycle of the synchronization signal received from the synchronization outputting unit 213. Furthermore, the synchronization outputting unit 213 calculates as a cycle the value obtained by multiplying the ratio of cycle T1 of the held first signal to the calculated cycle of the synchronization signal by a predetermined scale factor, and outputs the third signal at the calculated cycle.

By this means, the synchronization outputting unit 213 can make the frequency of the third signal to be output equal to the frequency of the first signal or the integral multiple of the integral reciprocal of the first signal frequency. That is, the synchronization outputting unit 213 can synchronize the first signal and the third signal. Here, the synchronization outputting unit 213 may hold information showing the frequency of the first signal that is the reciprocal of the first signal cycle, instead of information showing the cycle of the first signal.

Moreover, as one example, after a predetermined amount of data is accumulated in the reception buffer unit 212, the synchronization outputting unit 213 starts the output of the third signal including this data. As one example, the third signal is a serial signal to transmit a signal of the first level or the second level at a constant cycle.

Here, the wireless transmitting unit 113 may wirelessly transmit the cycle of the first signal or the frequency of the first signal to the wireless receiving unit 211, and the synchronization outputting unit 213 may acquire the cycle of the first signal or the frequency of the first signal from the wireless receiving unit 211.

Figure 3:
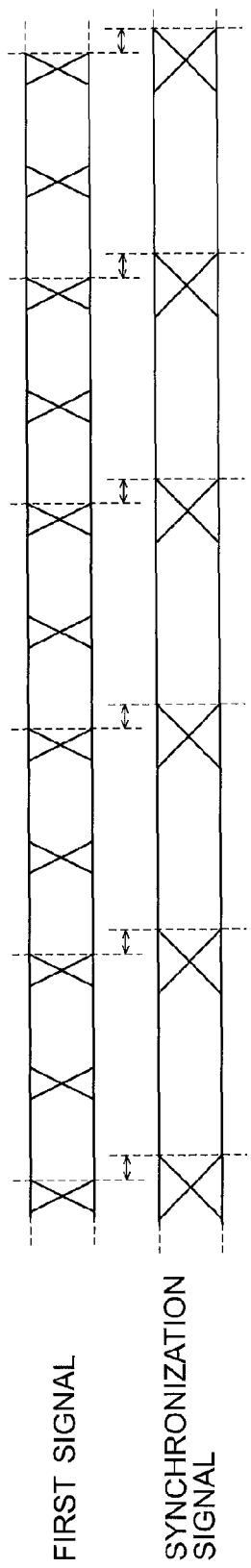
FIG. 3 illustrates one example in which the first signal and the synchronization signal are synchronized in the first embodiment.
Figure 4:
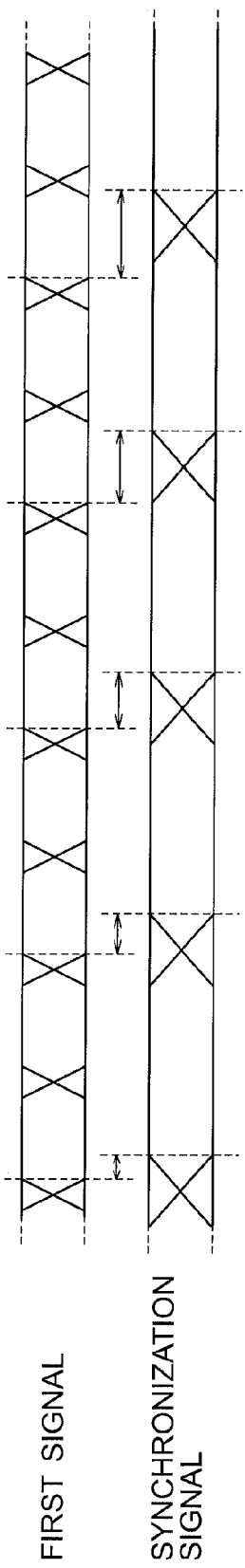
FIG. 4 illustrates one example in which the first signal and the synchronization signal are not synchronized in the first embodiment.

Synchronization of two signals of different frequencies is described in detail by the use of FIG. 3 and FIG. 4. FIG. 3 illustrates one example in which the first signal and the synchronization signal are synchronized in the first embodiment. The vertical axis shows the signal level and the horizontal axis shows the time. In both the first signal and the synchronization signal, the signal level has a binary value of the high level and the low level. The time difference between when the first signal becomes the high level from the low level and when the synchronization signal becomes the high level from the low level is shown by arrows, and the time difference is constant. For example, as illustrated in FIG. 3, the synchronization of the first signal and the synchronization signal with a lower frequency than that of the first signal shows that the time difference in the signal change timing is almost constant.

FIG. 4 illustrates one example in which the first signal and the synchronization signal are not synchronized in the first embodiment. The vertical axis shows the signal level and the horizontal axis shows the time. In both the first signal and the synchronization signal, the signal level has a binary value of the high level and the low level. The time difference between when the first signal becomes the high level from the low level and when the synchronization signal becomes the high level from the low level is shown by arrows, and the time difference is gradually extended over the time. As illustrated in FIG. 4, the situation in which the signal change interval gradually extends denotes a situation in which the two signals are not synchronized.

Figure 5:
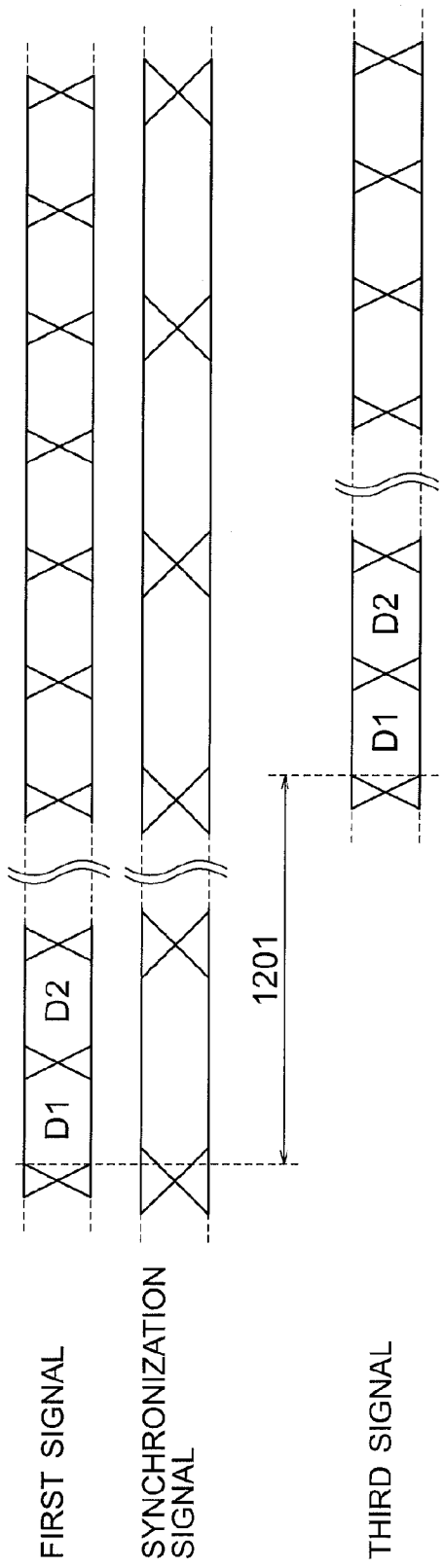
FIG. 5 illustrates the first example of a group of the first signal, the synchronization signal and the third signal in the first embodiment.
Figure 6:
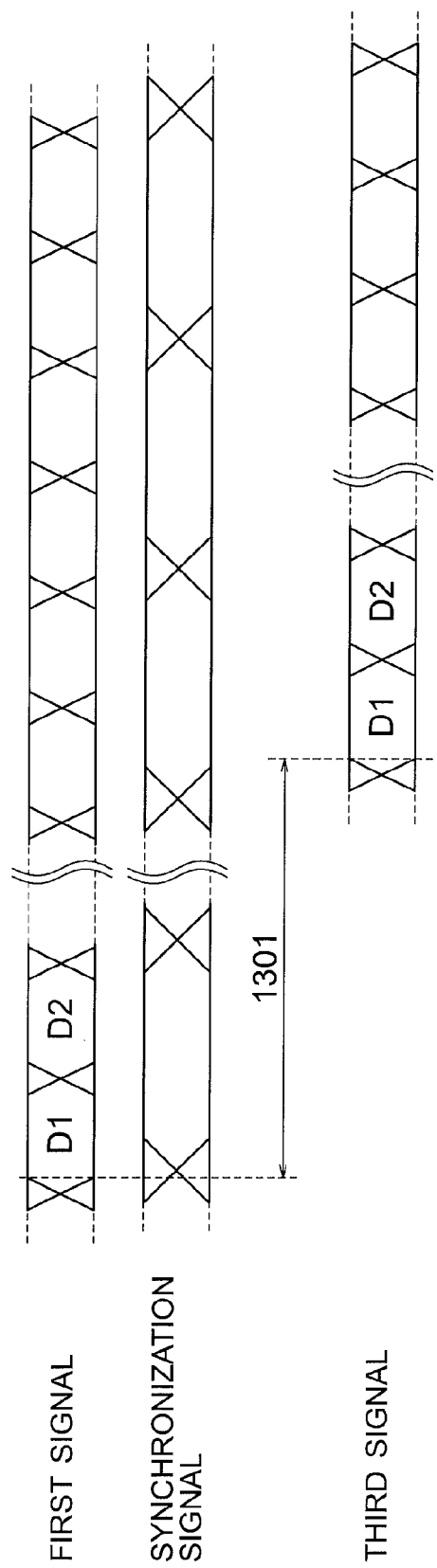
FIG. 6 is the second example of a group of the first signal, the synchronization signal and the third signal in the first embodiment.

The effect of the first embodiment is described in detail by the use of FIG. 5 and FIG. 6. In the first embodiment, the synchronization outputting unit 213 receives a synchronization signal via the second wiring 13. Since the synchronization signal is synchronized with the first signal, by outputting a signal by the use of the input synchronization signal, the synchronization outputting unit 213 can synchronize the first signal and the third signal.

FIG. 5 illustrates the first example of a group of the first signal, the synchronization signal and the third signal in the first embodiment. The vertical axis shows the signal level and the horizontal axis shows the time. It is shown that the first signal includes data D1 of one bit and data D2 of one bit. The frequency of the synchronization signal is a half of the frequency of the first signal. Although the third signal includes the same data as the first signal, it is shown that the third signal is delayed only by a cycle 1201 as compared with the first signal. This is caused by delay related to transmission by radio, for example. The frequency of the third signal is the same frequency as the frequency of the first signal.

FIG. 6 is the second example of a group of the first signal, the synchronization signal and the third signal in the first embodiment. Similarly to FIG. 5, the vertical axis shows the signal level and the horizontal axis shows the time. It is shown that the first signal includes data D1 of one bit and data D2 of one bit. The frequency of the synchronization signal is a half of the frequency of the first signal. The third signal includes the same data as that of the first signal. It is shown that the third signal is delayed by a cycle 1301 longer than the cycle 1201 in FIG. 5, as compared with the first signal. The frequency of the third signal is the same frequency as the frequency of the first signal.

The synchronization of the first signal and the third signal shows that the time difference between the change timings of the two signals is almost constant, and, unlike FIG. 5 and FIG. 6, it does not depend on the absolute value of the delay time. In other words, the synchronization shows a relationship that two signal frequencies are the same or one is the integral multiple of the integral reciprocal of the other.

For example, as illustrated in FIG. 5, in a case where the third signal is a serial signal to transmit a signal of the first level or the second level at a constant cycle, the synchronization outputting unit 213 may make the frequency of the third signal equal to that of the first signal and output it. To be more specific, for example, the synchronization outputting unit 213 detects frequency f2 of the synchronization signal from the minimum time interval between the rise of the synchronization signal and the fall of the synchronization signal. Furthermore, for example, the synchronization outputting unit 213 may divide frequency f1 of the first signal by frequency f2 of the synchronization signal and calculate the frequency ratio (f1/f2).

In the example in FIG. 5, since the frequency ratio (f1/f2) of the first signal and the synchronization signal is 2, the synchronization outputting unit 213 may output the third signal at time intervals that are half of time intervals at which the synchronization signal changes. Thus, it is possible to equalize the frequency of the first signal and the frequency of the third signal.

Here, for example, the synchronization outputting unit 213 may output the third signal at a frequency obtained by multiplying the frequency of the synchronization signal by the frequency ratio (f1/f2), that is, the same frequency as the first signal. At this time, the synchronization outputting unit 213 may output the third signal according to the timing of the rise of the synchronization signal.

In general, the cable wiring tends to be easily damaged as the pass frequency is higher. A case is assumed where the first wiring 114 is extended from the first module 11 to the second module 21 and the first signal is transmitted from the first module 11 to the second module 21 in the first wiring 114. In that case, since the lifetime of the first wiring 114 is short, there arises a problem that the exchange frequency of the first wiring 114 becomes high, and thus taking a lot of trouble to exchange the first wiring 114.

By contrast with this, in the present embodiment, the wireless transmitting unit 113 wirelessly transmits the first signal. By this means, as compared with transmission by wired communication, it is possible to save the effort of exchanging the wiring. Furthermore, since the second wiring 13 that transmits the second signal has a lower pass frequency than the first wiring 114, it is possible to give the resistance to the breakage of the second wiring 13.

Figure 7:
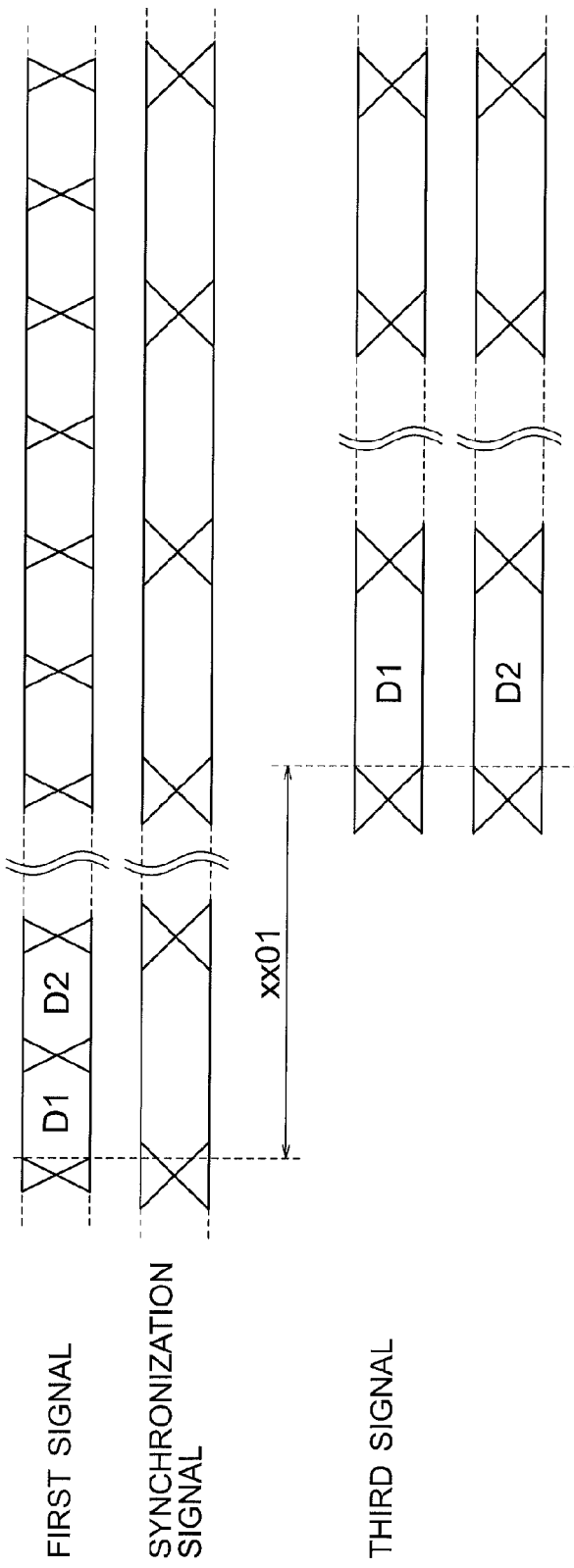
FIG. 7 illustrates one example of the third signal in a case where the third signal is a parallel signal in the first embodiment.

FIG. 7 illustrates one example of the third signal in a case where the third signal is a parallel signal in the first embodiment. In the figure, the vertical axis shows the signal level and the horizontal axis shows the time. It is shown that the first signal includes data D1 of one bit and data D2 of one bit. As one example, the synchronization signal is a half of the frequency of the first signal. As one example, it is shown that the third signal in FIG. 7 is two parallel signals, one signal includes data D1 of one bit and the other signal includes data D2 of one bit. It is shown that the third signal is delayed by cycle xx01 as compared with the first signal.

For example, in a case where the third signal is the parallel signals as illustrated in FIG. 7, as one example, the synchronization outputting unit 213 may parallelize the third signal by the frequency ratio of the first signal and the third serial signal and output the third signal at the same frequency as that of the synchronization signal. To be more specific, as one example, since the frequency ratio of the first signal and the synchronization signal is 2, the synchronization outputting unit 213 may assume the parallel number as 2 and output the third signal at the same frequency as that of the synchronization signal.

Moreover, for example, as the medium configuration between the configurations described using FIG. 5 and FIG. 7, in a case where the frequency of the first signal is X1×X2 times of the frequency of the synchronization signal, as one example, the synchronization outputting unit 213 may assume the parallel number of the third signal as 1 and make the frequency of the third signal X2 times of the frequency of the synchronization signal.

Effect of the First Embodiment

As described above, the transmitting device 1 according to the first embodiment includes: the wireless transmitting unit 113 that acquires the first signal and wirelessly transmits the acquired first signal; the wireless receiving unit 211 that receives the signal which the wireless transmitting unit 113 wirelessly transmitted and acquires the first signal; the synchronization signal outputting unit 12 that outputs the synchronization signal synchronized with the first signal; and the synchronization outputting unit 213 that receives the synchronization signal output by the synchronization signal outputting unit 12 and outputs the third signal synchronized with this received synchronization signal on the basis of the first signal acquired and received by the wireless receiving unit 211.

By this means, since the signal is wirelessly transmitted between the wireless transmitting unit 113 and the wireless receiving unit 211, it is possible to transmit a signal of a high frequency. Moreover, the synchronization outputting unit 213 can perform synchronization between the signal before wireless transmission and the signal after wireless transmission, by the use of the synchronization signal transmitted from the synchronization signal outputting unit 12. According to this, it is possible to transmitted a serial signal of a high frequency and perform synchronization between a signal before transmission and the signal after transmission.

Moreover, according to the first embodiment, the synchronization outputting unit 213 outputs the third signal at the signal data speed corresponding to that of the first signal, on the basis of the frequency ratio of the first signal received and acquired by the wireless receiving unit 211 and the synchronization signal output by the synchronization signal outputting unit 12. By this means, since the synchronization outputting unit 213 can make the frequency of the third signal equal to the frequency of the first signal or the frequency of integral multiple of integral reciprocal, it is possible to synchronize the third signal with the first signal.

Moreover, in the first embodiment, the wireless transmitting unit 113 acquires the first signal through the first wiring 114. The synchronization signal outputting unit 12 outputs a synchronization signal which is synchronized with the first signal and has a lower frequency than that of the first signal. The transmitting device 1 further includes the second wiring to transmit the synchronization signal, which has a lower pass frequency than that of the first wiring 114 and has been output by the synchronization signal outputting unit 12, to the synchronization outputting unit 213. By this means, although a wiring tends to be less damaged as the pass frequency is lower, since the second wiring 13 has a lower pass frequency than that of the first wiring 14, the second wiring 13 is less damaged.

Although a wiring itself has to be thinned to perform transmission at a high frequency, if the relative positions between modules change and the wiring is twisted, disconnection or degradation is likely to happen. Therefore, although it is necessary to use a thick wiring to avoid the disconnection, there is a problem that it is not possible to transmit a signal of a high frequency using the thick wiring.

By contrast with this, in the first embodiment, the wireless transmitting unit 113 is installed in the first module 11, at least part of the second wiring 13 is arranged in the first module 11 or on the surface, and the transmitting device 1 further includes the driving unit 15 that changes the relative positions of the first module 11 and the synchronization outputting unit 213.

By this means, even if the first module 11 and the synchronization outputting unit 213 change and the relative position of the second wiring 13 arranged in the first module 11 with respect to the synchronization outputting unit 213 of the second wiring 13 changes and a twist occurs, the second wiring 13 is thick, and therefore disconnection and degradation are less likely to be caused.

Moreover, in the present embodiment, the wireless receiving unit 211 is installed in the second module, and part of the second wiring 13 includes a module that can move according to the change in the relative positions of the first module 11 and the second module 21. By this means, even if the relative positions of the first module 11 and the second module 21 change, it is possible to transmit the second signal.

Second Embodiment

Subsequently, the second embodiment is described. A transmitting device 2 according to the second embodiment is different from the transmitting device 1 according to the first embodiment in that a synchronization signal outputting unit 12b generates a synchronization signal on the basis of the first signal.

Figure 8:
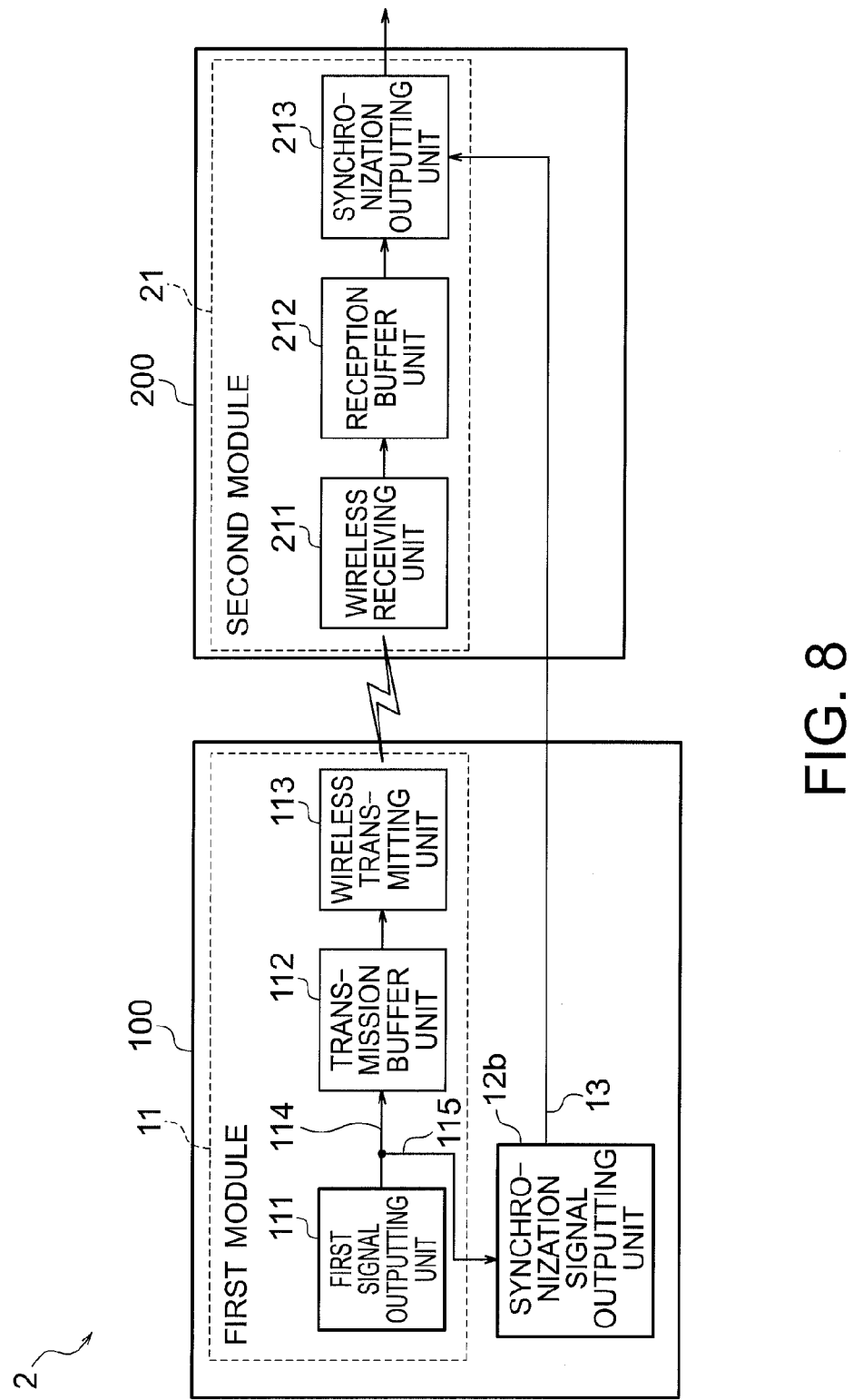
FIG. 8 is a schematic block diagram illustrating the composition of the transmitting device 2 in the second embodiment.

FIG. 8 is a schematic block diagram illustrating the composition of the transmitting device 2 in the second embodiment. Here, the same reference numerals are assigned to the common components with those of FIG. 1 and the specific explanation is omitted. The configuration of the transmitting device 2 in the second embodiment is one in which a third wiring 115 is added and the synchronization signal outputting unit 12 is replaced with the synchronization signal outputting unit 12b as compared with the configuration of the transmitting device 1 in the first embodiment.

In the present embodiment, as one example, the first signal output by the first signal outputting unit 111 is a serial signal to transmit a signal of the first level or the second level at a constant cycle. The third wiring 115 transmits the serial signal output by the first signal outputting unit 111 to the synchronization signal outputting unit 12b.

The synchronization signal outputting unit 12b generates a synchronization signal on the basis of the serial signal input from the first signal outputting unit 111 through the third wiring 115. Specifically, for example, the synchronization signal outputting unit 12b performs down-sampling of this serial signal and outputs the signal after the down-sampling to the second wiring 13 as the synchronization signal. Here, the down-sampling shows processing of periodically thinning out of a signal from the first signal.

Figure 9:
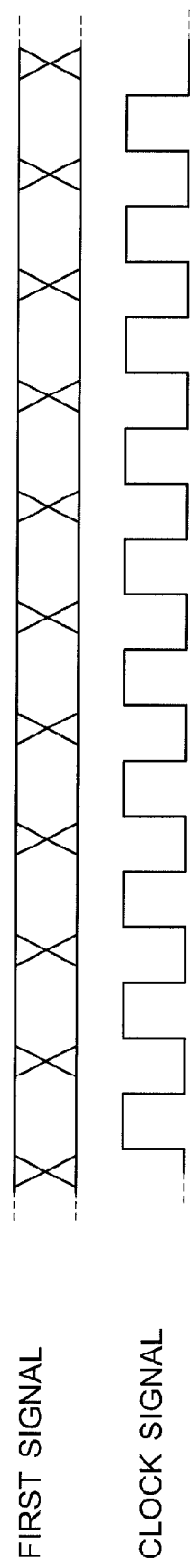
FIG. 9 is a first example of a clock signal in the second embodiment.

FIG. 9 is a first example of a clock signal in the second embodiment. In the figure, the vertical axis shows the signal level and the horizontal axis shows the time. In the figure, the first signal and the clock signal of the same frequency as the first signal are illustrated.

For example, the synchronization signal outputting unit 12b may generate a low clock signal of a lower frequency than that of the first signal from the first signal and use the generated clock signal as a synchronization signal. At this time, the synchronization signal outputting unit 12b may generate a clock signal of the same frequency as that of the first signal as illustrated in FIG. 9, and thereafter lower the frequency to generate the synchronization signal.

Figure 10:
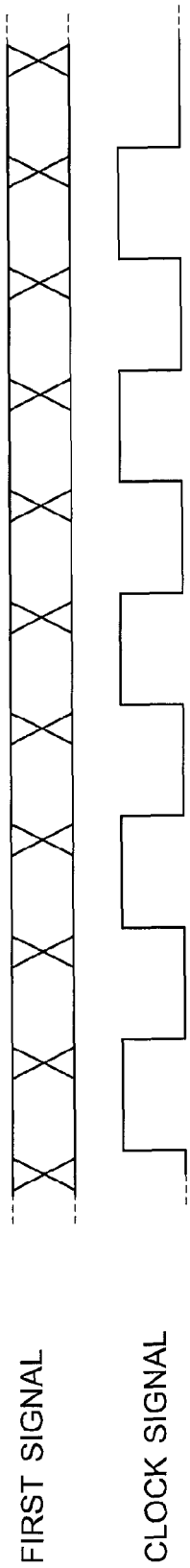
FIG. 10 is a second example of a clock signal in the second embodiment.

FIG. 10 is a second example of a clock signal in the second embodiment. In the figure, the vertical axis shows the signal level and the horizontal axis shows the time. The figure illustrates the first signal and a clock signal of a lower frequency than that of the first signal.

Moreover, the synchronization signal outputting unit 12b may generate a clock signal of a lower frequency than that of the first signal from the first signal as illustrated in FIG. 10. The synchronization signal outputting unit 12b may generate the clock signal from the first signal by the use of a technique known as clock data recovery.

As described above, in the second embodiment, the synchronization signal outputting unit 12 performs down-sampling of the first signal, generates a synchronization signal and outputs the generated synchronization signal. By this means, since the synchronization signal is generated by performing down-sampling, it is easy to realize the generation of the synchronization signal. Furthermore, in a case where a device using an existing cable wiring is replaced with the transmitting device 2 in the second embodiment, there is an advantage that fewer revision parts are needed.

Here, in the present embodiment, although the synchronization signal outputting unit 12 generates a synchronization signal by performing down-sampling of the first signal and outputs the generated synchronization signal, it is not limited to this.

The synchronization signal outputting unit 12 may generate a clock signal of a lower frequency than that of the first signal from the first signal output by the first signal outputting unit 111, by the use of a phase lock loop (phase synchronization circuit), and output the generated clock signal as a synchronization signal. For example, the phase lock loop here is a circuit that applies feedback control based on the first signal, generates a signal of the integral multiple of the integral reciprocal of the input signal (where the integral multiple of the integral reciprocal is less than 1) from another transmitter and outputs it.

By using this phase lock loop, the frequency division accuracy of the synchronization signal with respect to the first signal improves. The synchronization outputting unit 213 generates the third signal synchronized with the first signal by the use of the synchronization signal, it is possible to improve the synchronous accuracy of the first signal and the third signal.

Here, the wireless transmitting unit 113 may operate according to a clock signal independent from the first signal output from the first signal outputting unit 111. To be more specific, the wireless transmitting unit 113 may generate a transmission signal by packetizing and modulating a signal buffered by the transmission buffer unit 112, by the use of a clock signal that is not synchronized with the first signal. By this means, since it is not necessarily required to synchronize the first signal and the clock signal, the frequency of a clock signal that drives the wireless transmitting unit 113 is not limited, and therefore it is possible to acquire an effect of being able to select a frequency more suitable for the wireless transmitting unit 113.

Moreover, in the above-mentioned embodiment, when the synchronization outputting unit 213 performs synchronization by the use of a synchronization signal, it is possible to synchronize the third signal and the first signal. Therefore, even if the operation or signal itself of the wireless transmitting unit 113 is not synchronized with these third signal and first signal, it is possible to synchronize the third signal and the first signal.

Similarly, a clock signal that drives the wireless receiving unit 211 may not be synchronized with the first signal and the synchronization signal. Since the frequency of the clock signal that drives the wireless receiving unit 211 is not limited by not performing synchronization in this way, it is possible to acquire an effect of being able to select a frequency more suitable for the wireless receiving unit 211.

The wireless transmitting unit 113 and the wireless receiving unit 211 may perform packet communication. Furthermore, in a case where an error occurs in a packet, retransmission processing may be performed. By this means, it is possible to acquire an effect of being able to wirelessly transmit the first signal more accurately.

The synchronization outputting unit 213 may start the output of the third signal after a predetermined amount of data is accumulated in the reception buffer unit 212 by. Thus, in a case where the delay amount related to transmission changes, it is possible to reduce the probability that a problem occurs where data read out from the reception buffer unit 212 is temporarily lost.

In a case where the above-mentioned retransmission processing is performed, especially the delay amount is likely to vary, and therefore the present scheme is effective. For example, the synchronization outputting unit 213 may start the output of the third signal after the delay amount caused by retransmission processing is estimated and data corresponding to the estimated delay amount is saved in the reception buffer unit 212. By this means, it is possible to reduce the probability that a problem occurs where data read out from the reception buffer is temporarily lost. The synchronization outputting unit 213 may output the fixed value such as 0 and 1 instead of the third signal until when the output of the third signal starts.

Figure 11:
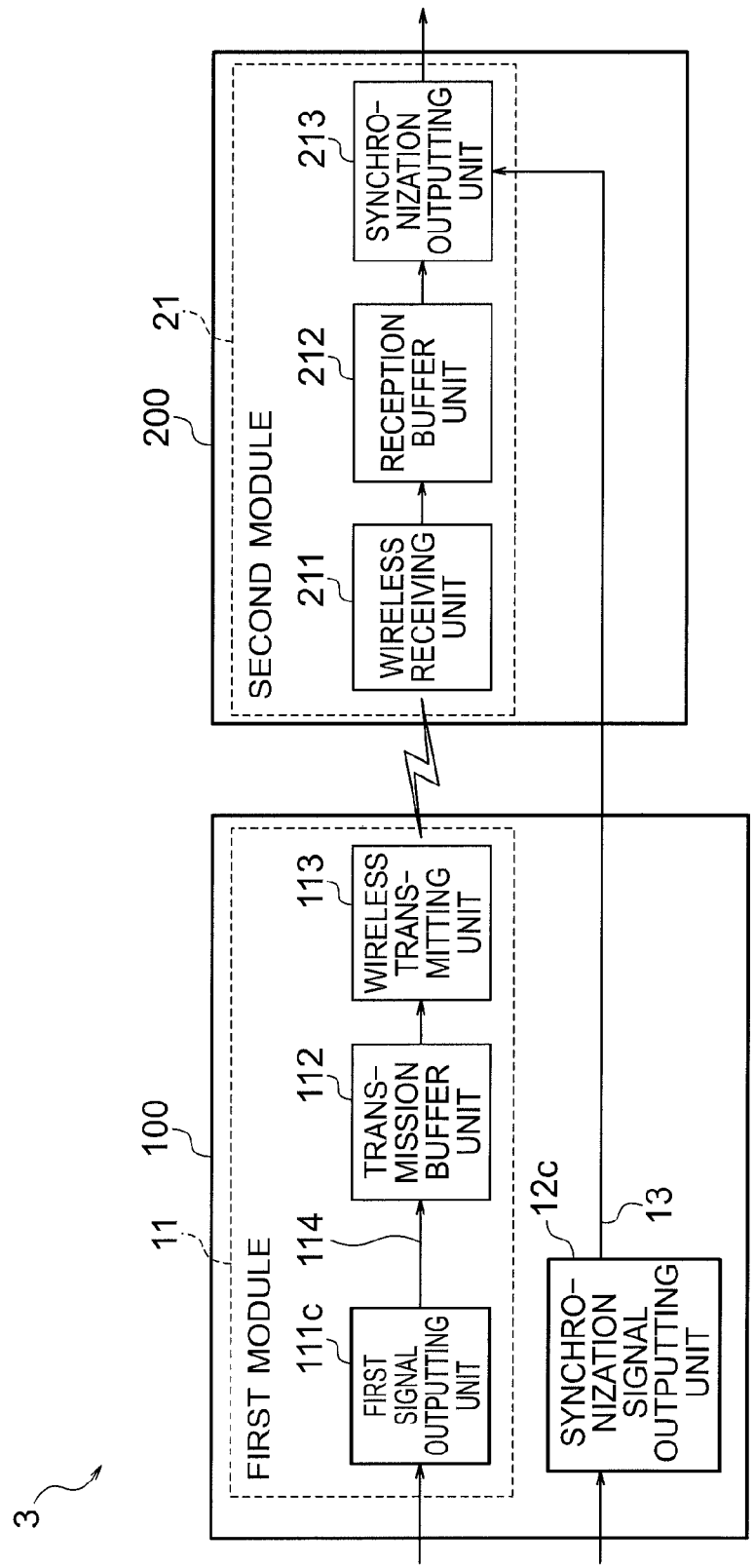
FIG. 11 is a schematic block diagram illustrating the configuration of a transmitting device 3 in a first modified example.

Here, as illustrated in FIG. 11, a first signal outputting unit 111c and a synchronization signal outputting unit 12c may function as an interface that supplies a signal input from the outside to the inside instead of internally generating a signal.

FIG. 11 is a schematic block diagram illustrating the configuration of a transmitting device 3 in a first modified example. Here, the same reference numerals are assigned to the common components with those of FIG. 1 and the specific explanation is omitted. The configuration of the transmitting device 3 in the first modified example is one in which the first signal outputting unit 111 is replaced with the first signal outputting unit 111c and the synchronization signal outputting unit 12 is replaced with the synchronization signal outputting unit 12c as compared with the configuration of the transmitting device 1 in the first embodiment.

Although the first signal outputting unit 111c has a similar function to the first signal outputting unit 111 of the first embodiment, they are different in that the first signal is received from the outside. For example, the first signal outputting unit 111c receives an image signal output by an external imaging device, as the first signal.

Although the synchronization signal outputting unit 12c has a similar function to the synchronization signal outputting unit 12 of the first embodiment, they are different in that a synchronization signal is received from the outside. For example, the synchronization signal outputting unit 12c receives a clock signal output by the above-mentioned external imaging device, as the synchronization signal.

Figure 12:
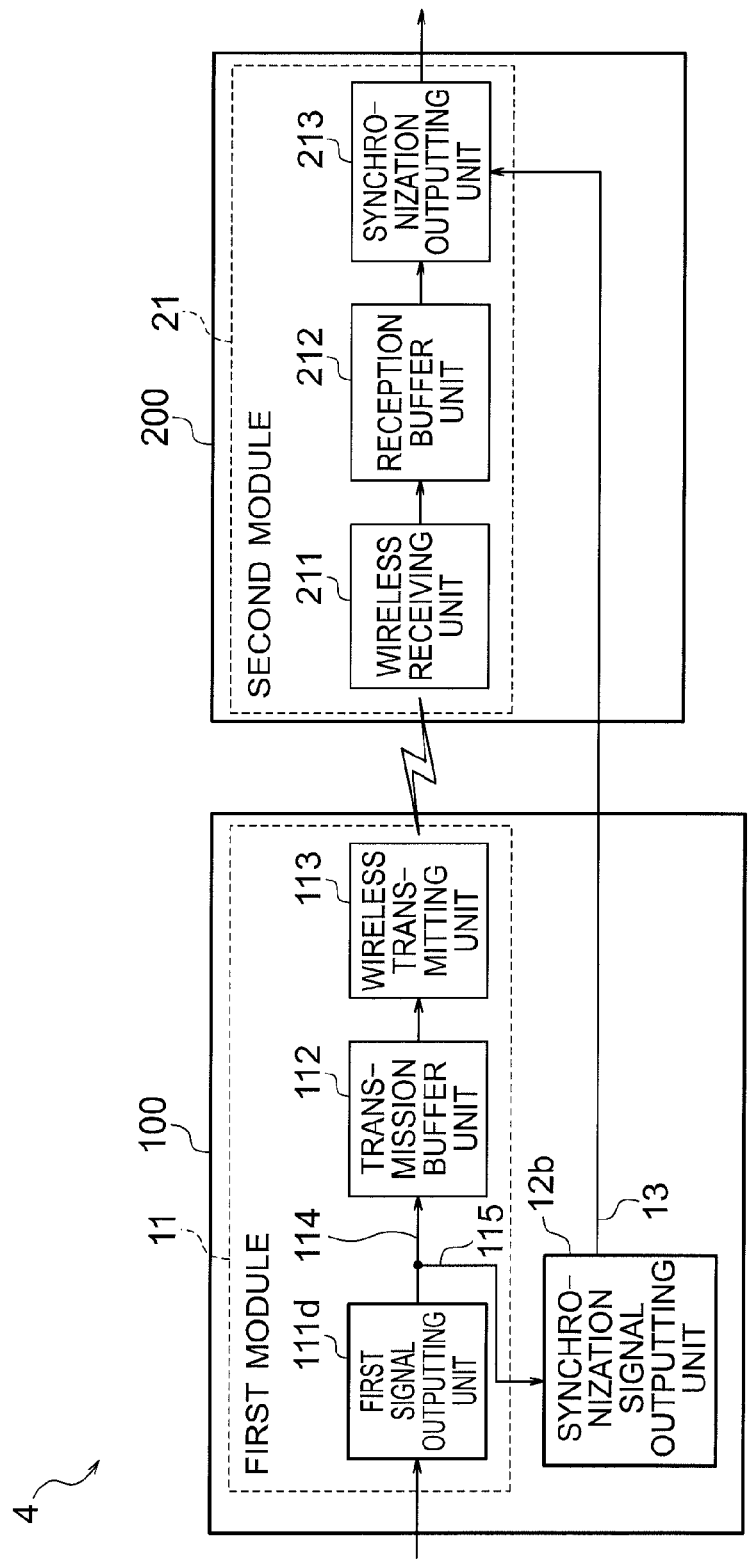
FIG. 12 is a schematic block diagram illustrating the configuration of a transmitting device 4 in a second modified example.

Here, in the case of a configuration in which the synchronization signal outputting unit generates a synchronization signal by the use of the first signal as illustrated in FIG. 8, only a first signal outputting unit 111d functions as an interface that internally supplies a signal input from the outside as illustrated in FIG. 12.

FIG. 12 is a schematic block diagram illustrating the configuration of a transmitting device 4 in a second modified example. Here, the same reference numerals are assigned to the common components with those of FIG. 8 and the specific explanation is omitted. The configuration of the transmitting device 4 in the second modified example is one in which the first signal outputting unit 111 is replaced with the first signal outputting unit 111d in the configuration of the transmitting device 2 in the second embodiment.

Although the first signal outputting unit 111d has a similar function to the first signal outputting unit 111 of the second embodiment, they are different in that the first signal is received from the outside. For example, the first signal outputting unit 111d receives an image signal output by an external imaging device, as the first signal.

Figure 13:
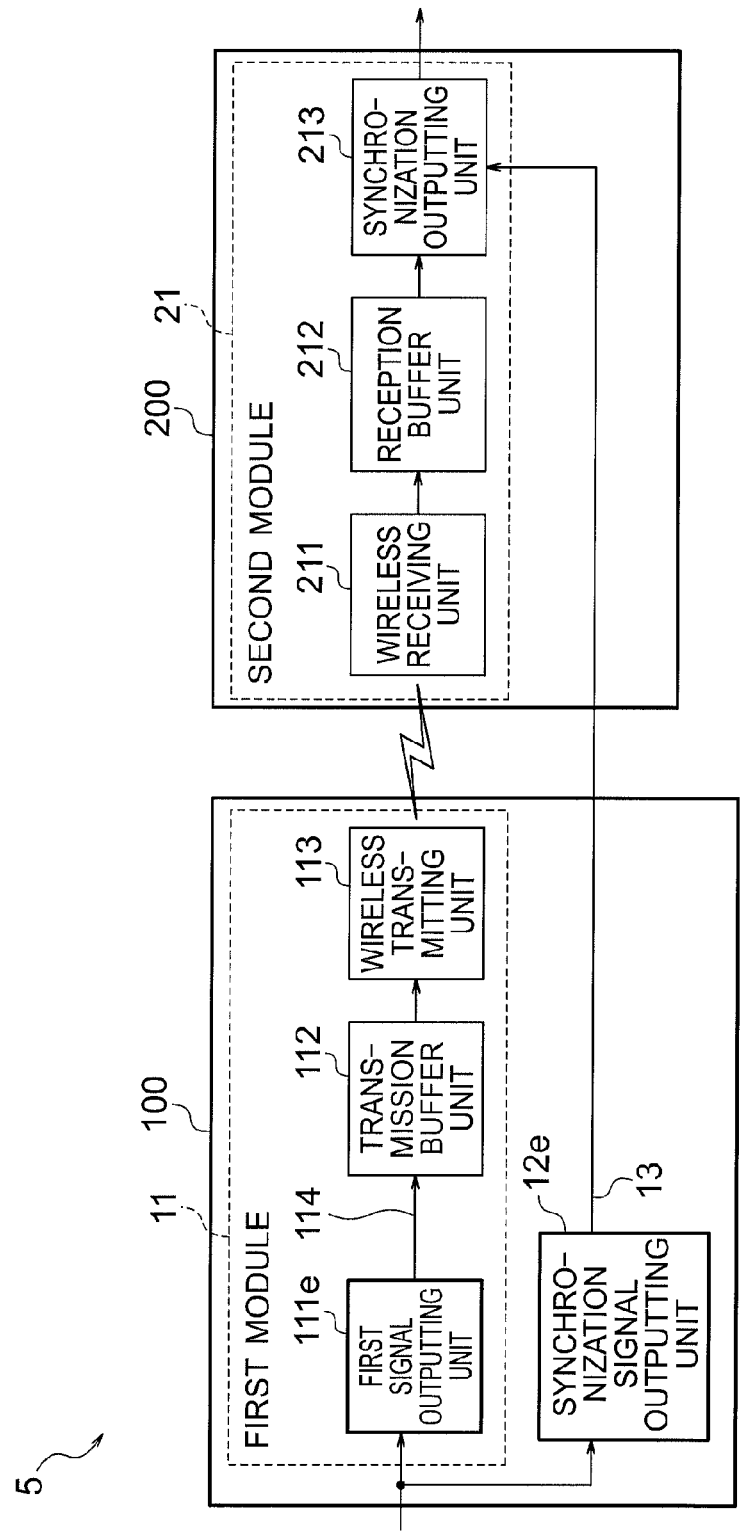
FIG. 13 is a schematic block diagram illustrating the configuration of a transmitting device 5 in a third modified example.

Here, as illustrated in FIG. 13, a signal to be input in a first signal outputting unit 111e may be diverged and input in a synchronization signal outputting unit 12e.

FIG. 13 is a schematic block diagram illustrating the configuration of a transmitting device 5 in a third modified example. Here, the same reference numerals are assigned to the same components with those of FIG. 2 and the specific explanation is omitted. The configuration of the transmitting device 5 in the third modified example is one in which the first signal outputting unit 111 is replaced with the first signal outputting unit 111e and the synchronization signal outputting unit 12 is replaced with the synchronization signal outputting unit 12e as compared with the configuration of the transmitting device 1 in the first embodiment.

The first signal outputting unit 111e receives the first signal from the outside and outputs the received first signal to the transmission buffer unit 112 through the first wiring 114.

For example, the synchronization signal outputting unit 12e receives the first signal from the outside and generates a synchronization signal on the basis of the received first signal. Furthermore, the synchronization signal outputting unit 12e outputs the generated synchronization signal to the synchronization outputting unit 213 through the second wiring 13.

Figure 14:
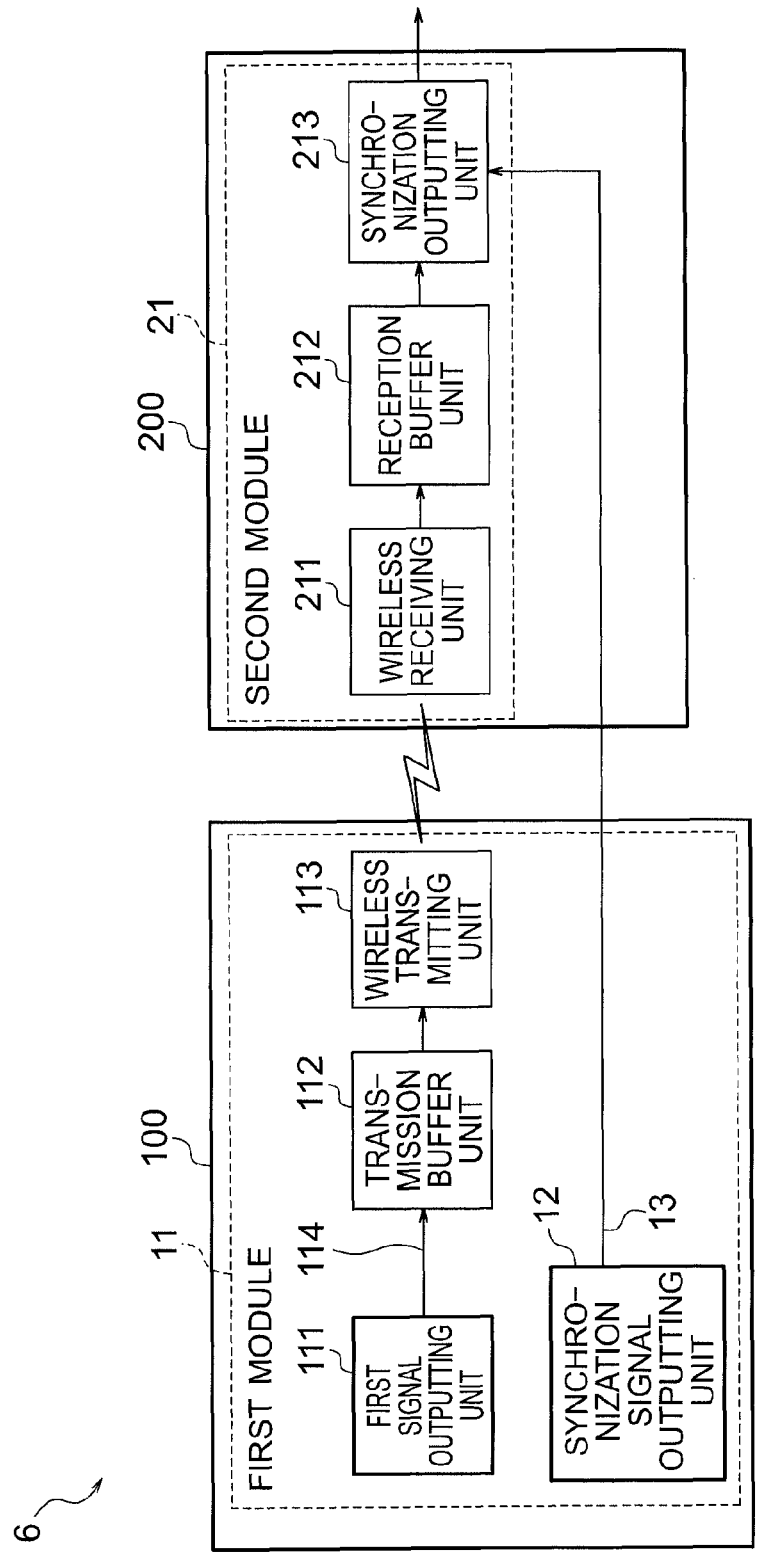
FIG. 14 is a schematic block diagram illustrating the configuration of a transmitting device 6 in a fourth modified example.

Here, as illustrated in FIG. 14, the first module 11 may further include the synchronization signal outputting unit 12. FIG. 14 is a schematic block diagram illustrating the configuration of a transmitting device 6 in a fourth modified example. Here, the same reference numerals are assigned to the same components with those of FIG. 2 and the specific explanation is omitted. The configuration of the transmitting device 6 in the fourth modified example is one in which the first module 11 further includes the synchronization signal outputting unit 12 as compared with the transmitting device 1 in the first embodiment.

Figure 15:
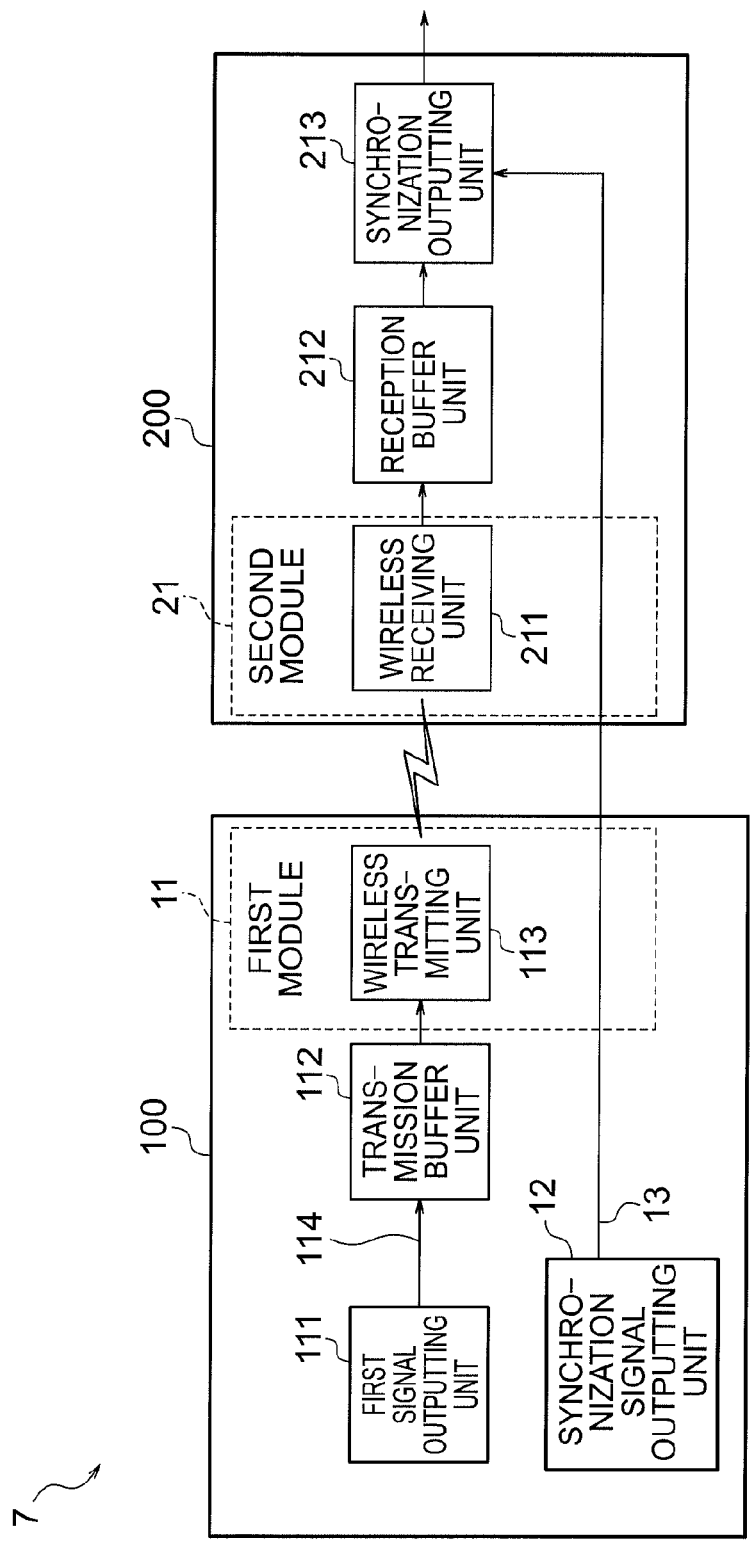
FIG. 15 is a schematic block diagram illustrating the configuration of a transmitting device 7 in a fifth modified example.

As illustrated in FIG. 15, the first module 11 may include the wireless transmitting unit 113 and part of the second wiring 13, and the second module 21 may include the wireless receiving unit 211 and part of the second wiring 13. FIG. 15 is a schematic block diagram illustrating the configuration of a transmitting device 7 in a fifth modified example. Here, the same reference numerals are assigned to the same components with those of FIG. 2 and the specific explanation is omitted. The configuration of the transmitting device 7 in the fifth modified example is one in which the first module 11 does not include the first signal outputting unit 111 and the transmission buffer unit 112 and the second module 21 does not include the reception buffer unit 212 and the synchronization outputting unit 213 as compared with the configuration of the transmitting device 1 in the first embodiment, and they are different in that the second module 21 further includes part of the second wiring 13.

Here, the transmitting device is not limited to have the entire configuration illustrated in FIG. 1. The transmitting device may have the entire configuration according to the following third to fifth embodiments.

Third Embodiment

Subsequently, the third embodiment is described. The third embodiment is different from the first embodiment in that the first module can move on the surface parallel to the XY plane by being driven by a driving unit 158 as illustrated in FIG. 16 instead of rotation.

Figure 16:
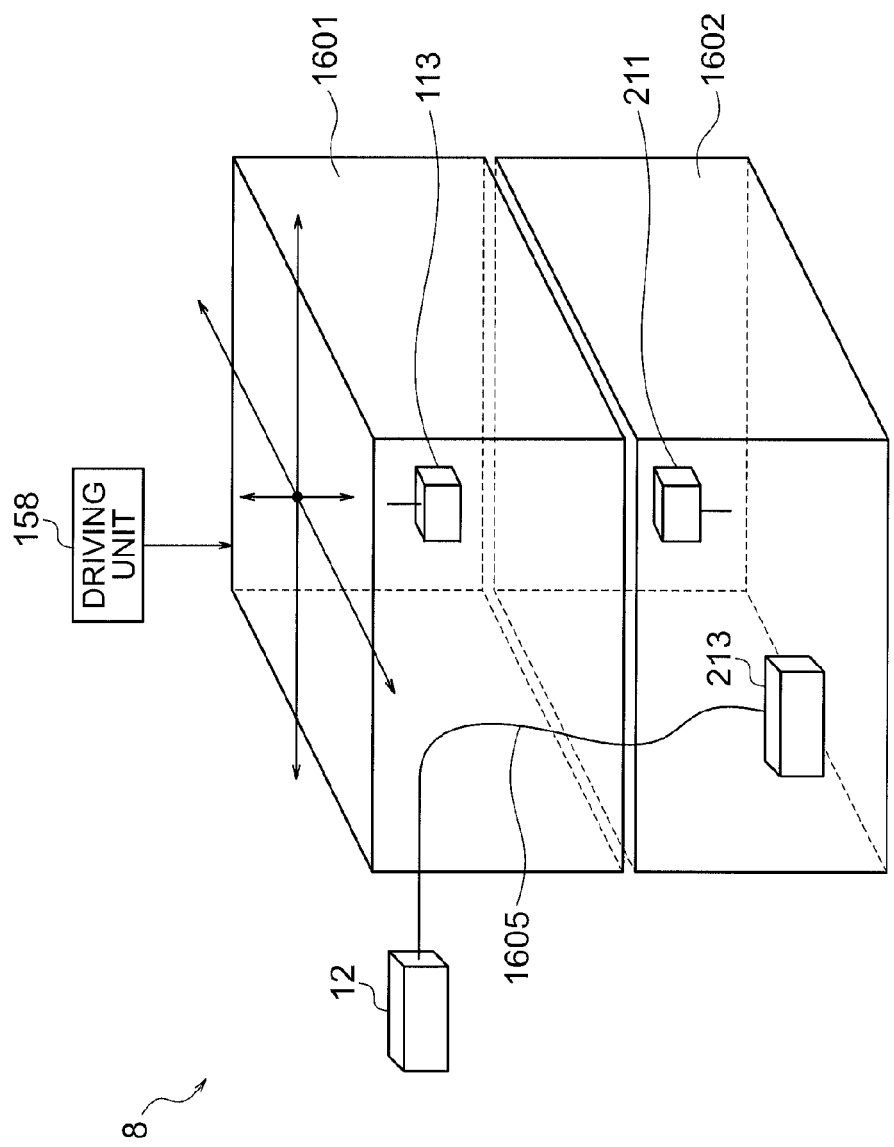
FIG. 16 is a schematic outline view of a transmitting device 8 in the third embodiment.

FIG. 16 is a schematic outline view of a transmitting device 8 in the third embodiment. The transmitting device 8 includes a first module 1601, a second module 1602 and the driving unit 158.

FIG. 16 illustrates an example case where the first module 1601 moves on a surface parallel to the XY plane with respect to the second module 1602, and thereby the relative positions change.

The first module 1601 includes the wireless transmitting unit 113 and part of the second wiring 1605 whose one end is connected with the synchronization signal outputting unit 12 and whose the other end is connected with the synchronization outputting unit 213. As one example, the second wiring 1605 has a lower pass frequency than that of the first wiring 114.

The second module 1602 includes the wireless receiving unit 211 and the synchronization outputting unit 213 connected with the second wiring 1605.

As described above, in the third embodiment, since the second wiring 1605 has a lower pass frequency than that of the first wiring 114, even in a case where the first module 1601 and the second module 1602 relatively move, it is possible to reduce the probability of causing the breakage such as disconnection by providing a margin to a wiring as illustrated in the figure.

Here, for example, the second module 1602 may be the first module and the first module 1601 may be the second module. In that case, the wireless receiving unit 211 is replaced with the wireless transmitting unit and the wireless transmitting unit 113 is replaced with the wireless receiving unit.

Fourth Embodiment

Subsequently, the fourth embodiment is described. The fourth embodiment is different from the first embodiment in that the contact point of the first module and the contact point of the second module contact each other, and thereby a synchronization signal is transmitted.

Figure 17:
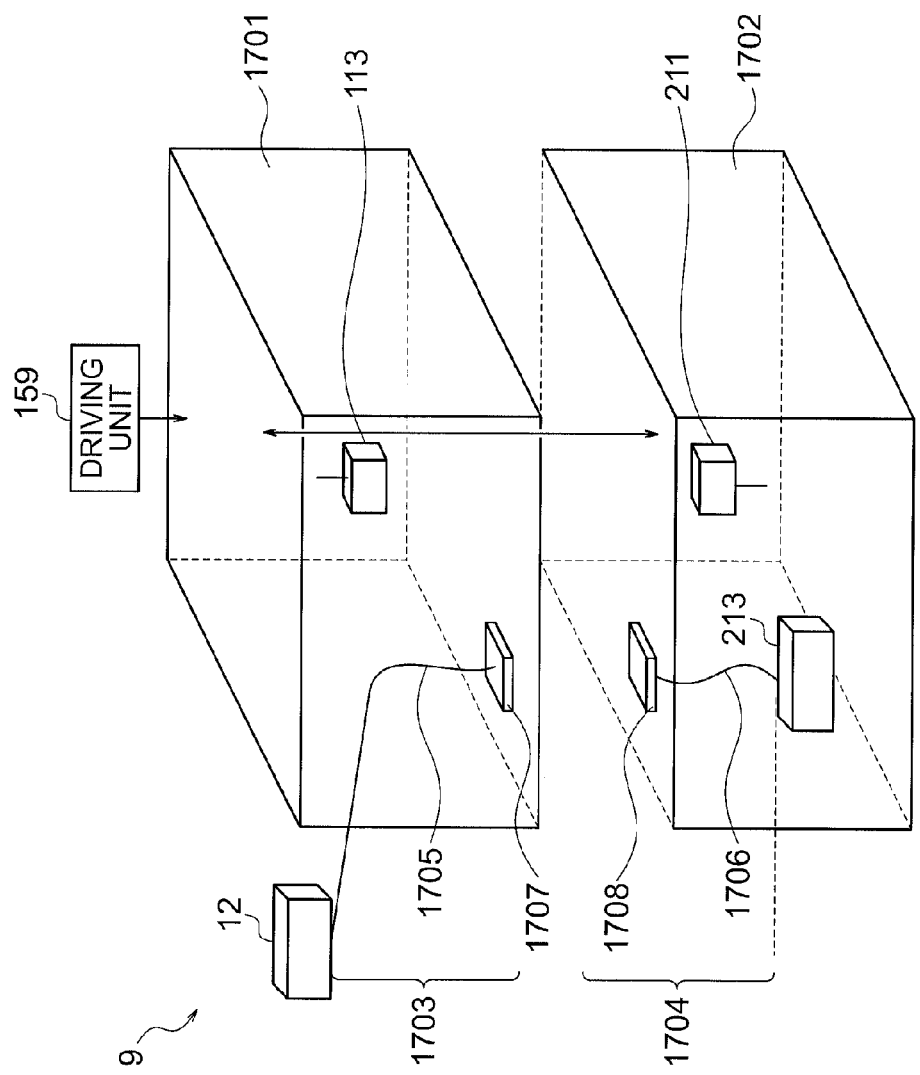
FIG. 17 is a schematic outline view of a transmitting device 9 in the fourth embodiment.

FIG. 17 is a schematic outline view of a transmitting device 9 in the fourth embodiment. In the example of FIG. 17, an example case is illustrated where a first module 1701 is attached to or removed from a second module 1702, and thereby the relative position of the first module 1701 with respect to that of the second module 1702 changes. In this example, although it is assumed that signal transmission is performed at the time of the attachment, since the attachment and the removal can be performed, there may be a case where the relative position changes at every attachment. Even if the positional difference is small, there may be a case where the change given to the propagation characteristic of a synchronization signal becomes large depending on the situation.

The transmitting device 9 includes the sending device 100 and the receiving device 200. The sending device 100 includes the wireless transmitting unit 113, the synchronization signal outputting unit 12 and a first part 1703. The receiving device includes the wireless receiving unit 211, the synchronization outputting unit 213 and a second part 1704. Here, the second wiring 13 includes the first part 1703 and the second part 1704. The transmitting device 9 is configured such that one end of the first part 1703 is electrically connected with the synchronization signal outputting unit 113, one end of the second part 1704 is electrically connected with the synchronization outputting unit 211, and another end of the first part 1703 and another end of the second part 1704 can be mutually separated and coupled.

The first module 1701 includes the wireless transmitting unit 113, a first contact point 1707 and part of a wiring 1705 whose one end is connected with the first contact point 1707 and whose other end is connected with the synchronization signal outputting unit 12.

The second module 1702 includes the synchronization outputting unit 211, the synchronization outputting unit 213, a second contact point 1708 and a wiring 1706 whose one end is connected with the second contact point 1708 and whose other end is connected with the synchronization outputting unit 213.

The first contact point 1707 is connected with the synchronization signal outputting unit 12 through the wiring 1705.

The second contact point 1708 is connected with the synchronization outputting unit 213 through the wiring 1706. The first contact point 1707 and the second contact point 1708 may be connectors or receptacles.

As one example, the second wiring 13 is divided into the wiring 1705 and the wiring 1706 through the first contact point 1707 and the second contact point 1708.

A driving unit 159 causes the first contact point 1707 and the second contact point 1708 to contact with each other. By this means, a synchronization signal is transmitted from the synchronization signal outputting unit 12 to the synchronization outputting unit 213.

As described above, in the fourth embodiment, a wireless transmitting unit 1703 is installed in the first module 1701 and a wireless receiving unit 1704 is installed in the second module 1702. Furthermore, the first module 1701 includes the first contact point 1707 connected with the synchronization signal outputting unit 12, and the second module 1702 includes the second contact point 1708 connected with the synchronization outputting unit 213 and further includes the driving unit 159 that causes the first contact point 1707 and the second contact point 1708 to contact with each other.

By this means, when the first contact point 1707 and the second contact point 1708 contact with each other, a synchronization signal is surely transmitted from the synchronization signal outputting unit 12 to the synchronization outputting unit 213.

Moreover, in a case where a signal is transmitted when the contact points installed in the respective modules contact with each other for conduction, since the impedance changes depending on the contact condition of the contact points, there is a problem that it is difficult to transmit a signal of a high frequency. By contrast with this, since a synchronization signal has a low frequency in the fourth embodiment, even if the impedance changes depending on the contact condition of the first contact point 1707 and the second contact point 1708, the synchronization signal is transmitted from the synchronization signal outputting unit 12 to the synchronization outputting unit 213 through the first contact point 1707 and the second contact point 1708.

Here, the first module 1701 may be the second module and the second module 1702 may be the first module. In that case, the wireless transmitting unit 1703 becomes a wireless receiving unit and the wireless receiving unit 1704 becomes a wireless transmitting unit.

Fifth Embodiment

Subsequently, the fifth embodiment is described. The fifth embodiment is different from the first embodiment in that, by putting the first module into the second module, the contact point of the first module and the contact point of the second module contact with each other and a synchronization signal is transmitted.

Figure 18:
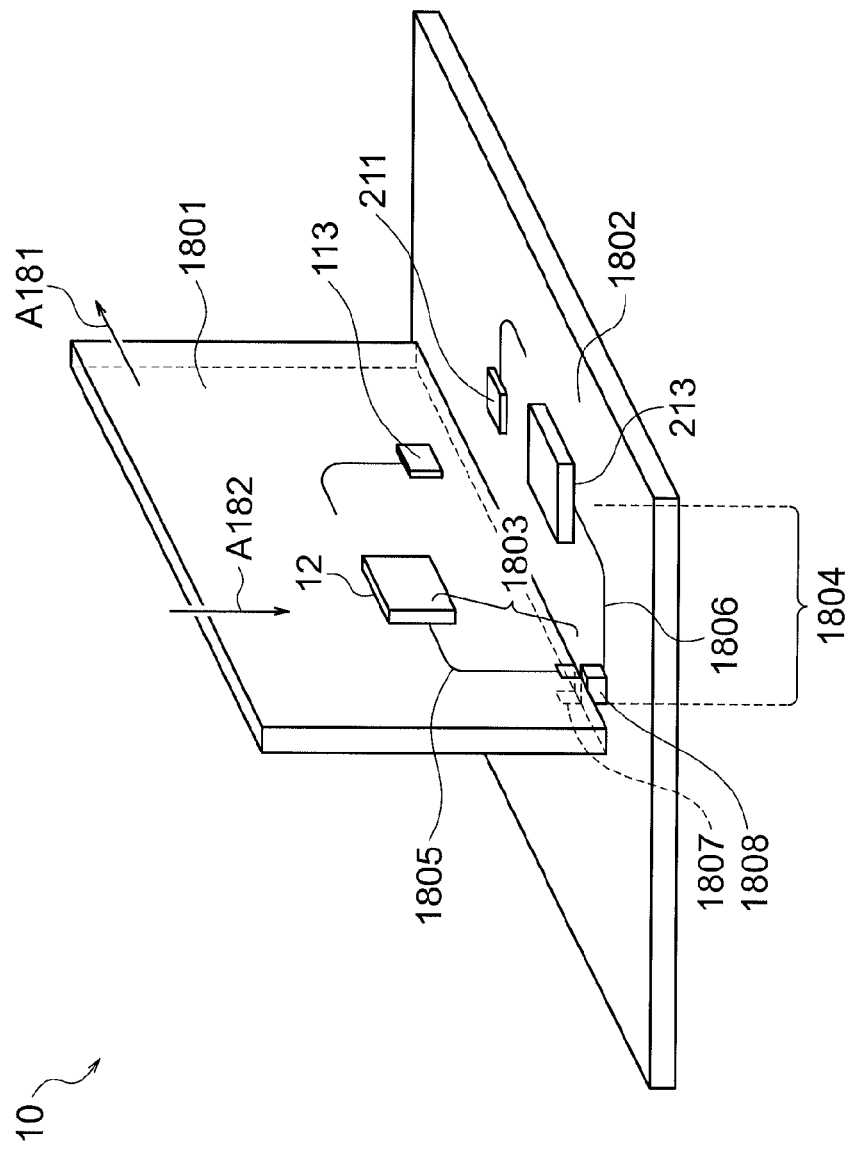
FIG. 18 is a schematic outline view of a transmitting device 10 in the fifth embodiment.

FIG. 18 is a schematic outline view of a transmitting device 10 in the fifth embodiment. FIG. 18 is one more specific example of the example illustrated in FIG. 17.

A first module 1801 includes a wireless transmitting unit 113, the synchronization signal outputting unit 12 and a first part 1803 of which one end is electrically connected with the synchronization signal outputting unit 12. Here, the first part 1803 includes a wiring 1805 whose one end is connected with the synchronization signal outputting unit 12, and a first contact point 1807 connected with another end of the wiring 1805.

A second module 1802 includes a wireless receiving unit 211, the synchronization outputting unit 213 and a second part 1804 of which one end is electrically connected with the synchronization outputting unit 213. Here, the second part 1804 includes a wiring 1806 whose one end is connected with the synchronization outputting unit 213, and a second contact point 1808 connected with another end of the wiring 1806.

The first contact point 1807 and the second contact point 1808 are formed so as to be able to be mutually separated and coupled. According to this, the other end of the first part 1803 and the other end of the second part 1804 are formed so as to be able to be mutually separated and coupled.

As illustrated in FIG. 18, the first module 1801 and the second module 1802 are substrates, for example. Specifically, for example, the second module 1802 may be a backplane substrate and the first module 1801 may be a child substrate connected thereto and used.

As one example, the contact point 1807 and the contact point 1808 also function as a pedestal that fixes the relative positions of two modules.

The second module 1802 may be slid in a direction of arrow A181 to put the second module 1802 into the first module 1801. Alternatively, the second module 1802 may be put into the first module 1801 in a direction of arrow A182.

In a case where a signal is transmitted when the contact points installed in the respective modules contact with each other for conduction, since the impedance changes depending on the contact condition of the contact points, there is a problem that it is difficult to transmit a signal of a high frequency. By contrast with this, in the fifth embodiment, similarly to the fourth embodiment, since a synchronization signal has a low frequency, even if the impedance changes depending on the contact condition of the first contact point 1807 and the second contact point 1808, the synchronization signal is surely transmitted from the synchronization signal outputting unit 12 to the synchronization outputting unit 213 through the first contact point 1807 and the second contact point 1808.

Here, in each embodiment, the wireless transmitting unit 113 may transmit other signals together with the first signal. For example, the wireless transmitting unit 113 may transmit together multiple signals of the same data speed as that of the first signal. Moreover, for example, the wireless transmitting unit 113 may transmit together a signal of a lower frequency than that of the first signal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A transmitting device comprising:
a first signal generator which outputs a first signal having a constant cycle including data;
a wireless transmitter which wirelessly transmits the data included in the first signal;
a wireless receiver which receives the data wirelessly transmitted by the wireless transmitter;
a synchronization signal generator which outputs a synchronization signal to a signal transmitting medium of an electric conductor wherein a phase of the synchronization signal is synchronized with a phase of the first signal; and
a synchronization generator which receives the synchronization signal from the signal transmitting medium and outputs a signal including the data received by the wireless receiver according to the synchronization signal.

2. The transmitting device according to claim 1, wherein the synchronization signal is a signal having a constant cycle; and
a cycle of a signal output by the synchronization generator is a value obtained by multiplying a ratio of a cycle of the first signal to a cycle of the synchronization signal by a predetermined scale factor.

3. The transmitting device according to claim 2, wherein the synchronization signal output by the synchronization signal generator is synchronized with the first signal output by the first signal generator.

4. The transmitting device according to claim 3, wherein the synchronization signal output by the synchronization signal generator has a lower frequency than a frequency of the first signal output by the first signal generator.

5. The transmitting device according to claim 4, wherein the first signal output by the first signal generator is a serial signal to transmit a signal of a first level or a second level at a constant cycle; and
the synchronization signal generator performs down-sampling of the serial signal and outputs a signal after down-sampling as the synchronization signal.

6. The transmitting device according to claim 4, wherein the synchronization signal is a serial signal to transmit a signal of a first level or a second level at a constant cycle.

7. The transmitting device according to claim 4, wherein the synchronization signal is a clock signal.

8. The transmitting device according to claim 7, wherein the synchronization signal generator generates a clock signal from the first signal output by the first signal generator using a phase lock loop and outputs the clock signal as the synchronization signal.

9. The transmitting device according to claim 2, further comprising a transmission buffer which accumulates the data included in the first signal output from the first signal generator,
wherein the wireless transmitter reads out the data accumulated in the transmission buffer and wirelessly transmits a signal including the read data.

10. The transmitting device according to claim 9, further comprising:
a first wiring whose one end is electrically connected with the first signal generator and whose other end is electrically connected with the transmission buffer; and
a second wiring that is the signal transmitting medium,
wherein a pass frequency of the second wiring is lower than a pass frequency of the first wiring.

11. The transmitting device according to claim 10, wherein the synchronization signal generator and the synchronization generator are connected by the second wiring;
the synchronization signal generator and the synchronization generator change a relative position in a state where the synchronization signal generator and the synchronization generator are connected with the second wiring; and
a diameter of the second wiring is larger than a diameter of the first wiring.

12. The transmitting device according to claim 10, wherein the second wiring includes a first part and a second part; and
one end of the first part is electrically connected with the synchronization signal generator and one end of the second part is electrically connected with the synchronization generator,
the second wiring further comprises coupling means that couples another end of the first part and another end of the second part such that the first part and the second part are electrically connected.

13. The transmitting device according to claim 10, wherein the second wiring includes a first part and a second part; and one end of the first part is electrically connected with the synchronization signal generator, one end of the second part is electrically connected with the synchronization generator and another end of the first part and another end of the second part are configured to be able to be mutually separated and coupled.

14. The transmitting device according to claim 13, further comprising:

a sending device including the wireless transmitter, the synchronization signal generator and the first part; and a receiving device including the wireless receiver, the synchronization generator and the second part.

15. The transmitting device according to claim 2, wherein the wireless transmitter operates according to a clock signal independent from the first signal output from the first signal generator.

16. The transmitting device according to claim 1, further comprising a reception buffer which accumulates data included in a signal received by the wireless receiver, wherein the synchronization generator starts an output of the signal including the data after a predetermined amount of the data is accumulated in the reception buffer.

17. A sending device comprising:

a first signal generator which outputs a first signal having a constant cycle including data;

a wireless transmitter which wirelessly transmits the data included in the first signal to a receiving device; and a synchronization signal generator which outputs a synchronization signal that controls a timing at which a signal including the data is output in the receiving device, to a signal transmitting medium of an electric conductor that is electrically connected with the receiving device, wherein a phase of the synchronization signal is synchronized with a phase of the first signal.

18. A receiving device comprising:

a wireless receiver which receives data that is wirelessly transmitted by a sending device which wirelessly transmits the data included in a first signal having a constant cycle; and a synchronization generator which receives a synchronization signal output from the sending device to a signal transmitting medium of an electric conductor, from the signal transmitting medium wherein a phase of the synchronization signal is synchronized with a phase of the first signal, and output a signal including data received in the wireless receiver according to the synchronization signal.

* * * * *